(12) United States Patent
Klipper et al.

(10) Patent No.: US 7,053,129 B1
(45) Date of Patent: May 30, 2006

(54) PROCESS FOR PREPARING MONODISPERSE ANION EXCHANGERS

(75) Inventors: Reinhold Klipper, Köln (DE); Werner Strüver, Leverkusen (DE); Ulrich Schnegg, Leverkusen (DE); Rüdiger Seidel, Leverkusen (DE); Alfred Mitschker, Odenthal (DE); Holger Lütjens, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/643,194

(22) Filed: Aug. 21, 2000

(30) Foreign Application Priority Data

Aug. 27, 1999 (DE) ............................... 199 40 864
Nov. 12, 1999 (DE) ............................... 199 54 393

(51) Int. Cl.
*C08F 8/32* (2006.01)

(52) U.S. Cl. ..................................................... 521/32
(58) Field of Classification Search ................... 521/32
See application file for complete search history.

(56) References Cited

U.S. PATENT DOCUMENTS

| | | | |
|---|---|---|---|
| 3,006,866 A * | 10/1961 | Corte | |
| 3,586,646 A | 6/1971 | Corte et al. | |
| 3,716,482 A | 2/1973 | Corte et al. | ........... 210/37 |
| 3,989,650 A | 11/1976 | Lange | |
| 3,994,719 A * | 11/1976 | Corte | |
| 4,077,918 A | 3/1978 | Corte et al. | |
| 4,232,125 A | 11/1980 | Buske | ........... 521/32 |
| 4,382,124 A | 5/1983 | Meitzner et al. | ........... 521/38 |
| 4,419,245 A | 12/1983 | Barrett et al. | ........... 210/681 |
| 4,427,794 A | 1/1984 | Lange et al. | ........... 521/28 |
| 4,444,961 A | 4/1984 | Timm | ........... 526/88 |
| 4,952,608 A * | 8/1990 | Klipper | ........... 521/32 |
| 5,231,115 A | 7/1993 | Harris | ........... 521/28 |

* cited by examiner

*Primary Examiner*—Bernard Lipman
(74) *Attorney, Agent, or Firm*—Jennifer R. Seng

(57) ABSTRACT

The present invention relates to a process for preparing novel, monodisperse anion exchangers by (a) reacting monomer droplets made from monovinylaromatic compounds and polyvinylaromatic compounds, and optional porogens and/or initiators, (b) amidomethylating the resultant monodisperse, crosslinked bead polymers with phthalimide derivatives, (c) converting the amidomethylated bead polymers to aminomethylated bead polymers, and (d) alkylating the aminomethylated bead polymers.

16 Claims, No Drawings

PROCESS FOR PREPARING MONODISPERSE ANION EXCHANGERS

BACKGROUND OF THE INVENTION

The present invention relates to a process for preparing novel, monodisperse anion exchangers, and also to their use.

U.S. Pat. No. 4,444,961 discloses, inter alia, a process for preparing monodisperse anion exchangers. Here, haloalkylated polymers are reacted with alkylamine.

EP-A 46,535 describes, with reference to U.S. Pat. No. 3,989,650, the preparation of a macroporous strongly basic anion exchanger with uniform particle size by a direct spraying and microencapsulation process. Here, the bead polymer is reacted with N-acetoxymethylphthalimide and subjected to further reaction steps to give a strongly basic anion exchanger having trimethylammonium groups.

The process described in EP-A 46,535 has various disadvantages.

a) First, it pollutes the environment and wastes resources, since the reaction inevitably releases acetic acid, which pollutes waste water and prevents economic operation of the overall process. In addition, account must be taken of the fact that acetic acid residues remain in the product and contaminate it. Residues of the acetic acid may moreover be released from the anion exchanger into liquids which are actually being passed through the anion exchanger for purification.

b) The yield of final anion exchanger product in liters per unit of starting material used is insufficient and not capable of further significant increase.

c) The utilizable capacity of the anion exchanger (i.e., its capacity to absorb anions) is moreover not sufficiently high.

The object of the present invention was to provide a method for preparing monodisperse anion exchangers, preferably monodisperse macroporous anion exchangers, with high mechanical and osmotic stability of the beads, with an increased absorption capacity for anions, and at the same time with reduced use of resources for preparing the anion exchangers themselves, and with high preparation yield and high purity of the functional basic groups. The products are also free from post-crosslinking.

SUMMARY OF THE INVENTION

The present invention provides a process for preparing monodisperse anion exchangers comprising
(a) reacting monomer droplets made from at least one monovinylaromatic compound and at least one polyvinylaromatic compound, and, if desired, a porogen and/or, if desired, an initiator or an initiator combination to give a monodisperse, crosslinked bead polymer,
(b) amidomethylating the monodisperse, crosslinked bead polymer from step (a) with phthalimide derivatives,
(c) converting the amidomethylated bead polymer from step (b) to an aminomethylated bead polymer, and
(d) alkylating the aminomethylated bead polymer from step (c).

The present invention also provides the amidomethylated bead polymers from process step (b), the aminomethylated products from process step (c), and the aminomethylated bead polymers obtained by alkylation in process step (d) and used in anion exchangers.

DETAILED DESCRIPTION OF THE INVENTION

Surprisingly, the monodisperse anion exchangers prepared according to the present invention present a higher yield, less pollution of the environment and a higher utilizable capacity during use than the resins known from the above-mentioned prior art.

The monodisperse, crosslinked vinylaromatic base polymer according to process step (a) may be prepared by the processes known from the literature. Processes of this type are described, for example, in U.S. Pat. No. 4,444,961, EP-A 46,535, U.S. Pat. No. 4,419,245, or WO 93/12167, the contents of which are incorporated into the present application by way of reference in relation to process step (a).

In process step (a), at least one monovinylaromatic compound and at least one polyvinylaromatic compound are used. However, it is also possible to use mixtures of two or more monovinylaromatic compounds and mixtures of two or more polyvinylaromatic compounds.

Preferred monovinylaromatic compounds for the purposes of the present invention in process step (a) are monoethylenically unsaturated compounds, such as styrene, vinyltoluene, ethylstyrene, $\alpha$-methylstyrene, chlorostyrene, chloromethylstyrene, alkyl acrylates, and alkyl methacrylates. Particular preference is given to the use of styrene or mixtures of styrene with the above-mentioned monomers.

Preferred polyvinylaromatic compounds for the purposes of the present invention for process step (a) are multifunctional ethylenically unsaturated compounds, such as divinylbenzene, divinyltoluene, trivinylbenzene, divinyinaphthalene, trivinyinaphthalene, 1,7-octadiene, 1,5-hexadiene, ethylene glycol dimethacrylate, trimethylolpropane trimethacrylate, or allyl methacrylate.

The amounts used of the polyvinylaromatic compounds are generally from 1 to 20% by weight (preferably from 2 to 12% by weight, particularly preferably from 4 to 10% by weight), based on the monomer or its mixture with other monomers. The nature of the polyvinylaromatic compounds (crosslinking agents) is selected with the subsequent use of the spherical polymer in mind. In many cases divinylbenzene is suitable. For most uses, commercial qualities of divinylbenzene are sufficient, and comprise ethylvinylbenzene besides the divinylbenzene isomers.

In one preferred embodiment of the present invention, microencapsulated monomer droplets are used in process step (a).

Possible materials for the microencapsulation of the monomer droplets are those known for use as complex coacervates, in particular polyesters, natural or synthetic polyamides, polyurethanes, and polyureas.

An example of a particularly suitable natural polyamide is gelatin, which is used in particular as coacervate and complex coacervate. For the purposes of the present invention, gelatin-containing complex coacervates are primarily combinations of gelatin with synthetic polyelectrolytes. Suitable synthetic polyelectrolytes are copolymers incorporating units of, for example, maleic acid, acrylic acid, methacrylic acid, acrylamide, or methacrylamide. Particular preference is given to the use of acrylic acid and acrylamide. Gelatin-containing capsules may be hardened using conventional hardeners, such as formaldehyde or glutaric dialdehyde. The encapsulation of monomer droplets with gelatin, with gelatin-containing coacervates and with gelatin-containing complex coacervates is described in detail in EP-A 46,535. The methods for encapsulation using synthetic polymers are known. An example of a highly suitable process is interfacial condensation, in which a reactive component dissolved in the monomer droplet (for example, an isocyanate or an acid chloride) is reacted with a second reactive component dissolved in the aqueous phase (for example, an amine).

The monomer droplets, which may be microencapsulated if desired, may, if desired, contain an initiator or mixtures of initiators to initiate the polymerization. Examples of initiators suitable for the novel process are peroxy compounds, such as dibenzoyl peroxide, dilauroyl peroxide, bis(p-chlorobenzoyl) peroxide, dicyclohexyl peroxydicarbonate, tert-butyl peroctoate, tert-butyl peroxy-2-ethylhexanoate, 2,5-bis (2-ethylhexanoyl-peroxy)-2,5-dimethylhexane, and tert-amylperoxy-2-ethylhexane, and azo compounds, such as 2,2'-azobis(isobutyronitrile) and 2,2'-azobis(2-methylisobutyronitrile).

The amounts used of the initiators are generally from 0.05 to 2.5% by weight (preferably from 0.1 to 1.5% by weight), based on the mixture of monomers.

To create a macroporous structure in the spherical polymer it is possible, if desired, to use porogens as other additives in the optionally microencapsulated monomer droplets. Suitable compounds for this purpose are organic solvents which are poor solvents and, respectively, swelling agents with respect to the polymer produced. Examples that may be mentioned are hexane, octane, isooctane, isododecane, methyl ethyl ketone, butanol, and octanol and isomers thereof.

Substances that are monodisperse for the purposes of the present application are those for which the diameter of at least 90% by volume or by weight of the particles varies from the most frequent diameter by not more than ±10% of the most frequent diameter.

For example, in the case of a substance with a most frequent diameter of 0.5 mm, at least 90% by volume or by weight have a size range from 0.45 to 0.55 mm, and in the case of a substance with a most frequent diameter of 0.7 mm, at least 90% by weight or by volume have a size range from 0.77 mm to 0.63 mm.

The concepts "microporous" or "gel" and "macroporous" have been described in detail in the technical literature.

Bead polymers preferred for the purposes of the present invention and prepared in process step (a) have a macroporous structure.

Monodisperse macroporous bead polymers may be produced, for example, by adding inert materials (porogens) to the monomer mixture during the polymerization. Suitable substances of this type are primarily organic substances that dissolve in the monomer but are poor solvents and, respectively, swelling agents for the polymer (precipitants for polymers), for example, aliphatic hydrocarbons (Farbenfabriken Bayer DBP 1045102, 1957; DBP 1113570, 1957).

U.S. Pat. No. 4,382,124, for example, uses alcohols having from 4 to 10 carbon atoms as porogen for preparing monodisperse, macroporous bead polymers based on styrene/divinylbenzene. An overview of preparation methods for macroporous bead polymers is also given.

The monomer droplets, which may be microencapsulated if desired, may also, if desired, comprise up to 30% by weight (based on the monomer) of crosslinked or non-crosslinked polymer. Preferred polymers derive from the above-mentioned monomers, particularly preferably from styrene.

The average particle size of the monomer droplets, which may be encapsulated if desired, is from 10 to 1000 µm, preferably from 100 to 1000 µm. The novel process is also very suitable for preparing monodisperse spherical polymers.

When monodisperse bead polymers are prepared according to process step (a) the aqueous phase may, if desired, comprise a dissolved polymerization inhibitor. Both inorganic and organic substances are possible inhibitors for the purposes of the present invention. Examples of inorganic inhibitors are nitrogen compounds, such as hydroxylamine, hydrazine, sodium nitrite, and potassium nitrite, salts of phosphorous acid, such as sodium hydrogen phosphite, and sulfur-containing compounds, such as sodium dithionite, sodium thiosulfate, sodium sulfite, sodium bisulfite, sodium thiocyanate, and ammonium thiocyanate. Examples of organic inhibitors are phenolic compounds, such as hydroquinone, hydroquinone monomethyl ether, resorcinol, pyrocatechol, tert-butyl-pyrocatechol, pyrogallol, and condensation products made from phenols with aldehydes. Other suitable organic inhibitors are nitrogen-containing compounds, including hydroxylamine derivatives, such as N,N-diethylhydroxylamine, N-isopropylhydroxylamine, and sulfonated or carboxylated derivatives of N-alkylhydroxylamine or of N,N-dialkylhydroxylamine, hydrazine derivatives, such as N,N-hydrazinodiacetic acid, nitroso compounds, such as N-nitrosophenylhydroxylamine, the ammonium salt of N-nitrosophenylhydroxylamine, or the aluminum salt of N-nitrosophenylhydroxylamine. The concentration of the inhibitor is from 5 to 1000 ppm (based on the aqueous phase), preferably from 10 to 500 ppm, particularly preferably from 10 to 250 ppm.

As mentioned above, the polymerization of the optionally microencapsulated monomer droplets to give the spherical monodisperse bead polymer may, if desired, take place in the presence of one or more protective colloids in the aqueous phase. Suitable protective colloids are natural or synthetic water-soluble polymers, such as gelatin, starch, polyvinyl alcohol, polyvinylpyrrolidone, polyacrylic acid, polymethacrylic acid, or copolymers made from (meth)acrylic acid and from (meth)acrylates. Other very suitable materials are cellulose derivatives, particularly cellulose esters and cellulose ethers, such as carboxymethylcellulose, methylhydroxyethylcellulose, methylhydroxypropylcellulose, and hydroxyethylcellulose. Gelatin is particularly suitable. The amount used of the protective colloids is generally from 0.05 to 1% by weight (preferably from 0.05 to 0.5% by weight), based on the aqueous phase.

The polymerization to give the spherical, monodisperse bead polymer in process step (a) may, if desired, also be carried out in the presence of a buffer system. Preference is given to buffer systems that set the pH of the aqueous phase at the beginning of the polymerization to between 14 and 6 (preferably between 12 and 8). Under these conditions protective colloids having carboxylic acid groups are present to some extent or entirely in the form of salts, which has a favorable effect on the action of the protective colloids. Particularly suitable buffer systems comprise phosphate salts or borate salts. For the purposes of the present invention, the terms phosphate and borate also include the condensation products of the ortho forms of corresponding acids and salts. The concentration of the phosphate or borate in the aqueous phase is from 0.5 to 500 mmol/l, preferably from 2.5 to 100 mmol/l.

The stirring speed during the polymerization is relatively non-critical and, unlike in conventional bead polymerization, has no effect on the particle size. The stirring speeds used are low speeds which are sufficient to keep the monomer droplets in suspension and to promote dissipation of the heat of polymerization. A variety of stirrer types can be used for this task. Gate stirrers with an axial action are particularly suitable.

The ratio by volume of encapsulated monomer droplets to aqueous phase is from 1:0.75 to 1:20, preferably from 1:1 to 1:6.

The polymerization temperature depends on the decomposition temperature of the initiator used and is generally from 50 to 180° C. (preferably from 55 to 130° C.). The polymerization takes from 0.5 hour to a few hours. It has proven successful to use a temperature program in which the polymerization is begun at a low temperature (for example, 60° C.) and the reaction temperature is raised as the polymerization conversion progresses. This is a very good way of fulfilling, for example, the requirement for a reaction that proceeds reliably and with a high polymerization conversion. After polymerization, the polymer is isolated using conventional methods (for example, by filtration or decanting) and washed if desired.

In process step (b) the amidomethylating reagent is first prepared. This is done, for example, by dissolving a phthalimide or a phthalimide derivative in a solvent and mixing with formalin. A bis(phthalimido) ether is then formed from this material with elimination of water. For the purposes of the present invention, preferred phthalimide derivatives are phthalimide itself and substituted phthalimides such as methylphthalimide.

Solvents used in process step (b) are inert and suitable for swelling the polymer and are preferably chlorinated hydrocarbons, particularly preferably dichloroethane or methylene chloride.

In process step (b) the bead polymer is condensed with phthalimide derivatives. The catalyst used here comprises oleum, sulfuric acid, or sulfur trioxide.

Process step (b) is carried out at temperatures of from 20 to 120° C., preferably from 50 to 100° C., particularly preferably from 60 to 90° C.

The elimination of the phthalic acid residue, and with this the release of the aminomethyl group, takes place in process step (c) via treatment of the phthalimidomethylated crosslinked bead polymer with aqueous or alcoholic solutions of an alkali metal hydroxide, such as sodium hydroxide or potassium hydroxide, at temperatures of from 100 to 250° C. (preferably from 120 to 190° C.). The concentration of the aqueous sodium hydroxide is from 10 to 50% by weight, preferably from 20 to 40% by weight. This process allows the preparation of crosslinked bead polymers containing aminoalkyl groups with substitution of the aromatic rings at a level greater than 1.

The resultant aminomethylated bead polymer is finally washed with deionized water until free of alkali.

In process step (d) the novel anion exchangers are prepared by reacting the monodisperse, crosslinked, vinylaromatic base polymer containing aminomethyl groups with alkylating agents in suspension.

For the purposes of the present invention, preferred alkylating agents are alkyl halides, halogenated alcohols, alkyl sulfates, dialkyl sulfates, alkyl oxides, Leuckart-Wallach reagents, or combinations of these alkylating agents with one another or following one another. Particular preference is given to chloromethane, ethylene oxide, propylene oxide, the Leuckart-Wallach reagents, or combinations of these. Leuckart-Wallach reagents are described, for example, in *Organikum [Organic Chemistry]*, VEB Deutscher Verlag der Wissenschaften, Berlin 1968, 8$^{th}$ Edition, page 479.

The suspension medium used comprises water or mineral acids. However, depending on the product desired, it is also possible, if desired, to add bases. Preference is given to the use of water. Possible bases are, as appropriate, aqueous sodium hydroxide, aqueous potassium hydroxide, or non-nucleophilic basic amines.

Process step (d) is carried out at temperatures of from 20 to 150° C. preferably from 40 to 110° C.) and at pressures of from atmospheric pressure to 6 bar (preferably at from atmospheric pressure to 4 bar).

The present invention also provides the monodisperse anion exchangers prepared by the novel process.

The novel process preferably gives monodisperse anion exchangers having the following functional groups that form during process step (d):

(1)

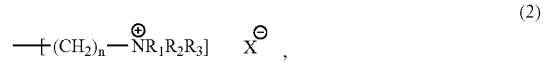
(2)

wherein $R_1$ is hydrogen, an alkyl group, a hydroxyalkyl group, or an alkoxyalkyl group, $R_2$ is hydrogen, an alkyl group, an alkoxyalkyl group, or a hydroxyalkyl group, $R_3$ is hydrogen, an alkyl group, an alkoxyalkyl group, or a hydroxyalkyl group, n is an integer from 1 to 5, particularly preferably 1, and X is an anionic counterion (preferably $Cl^\ominus$, $Br^\ominus$, $OH^\ominus$, $NO_3^\ominus$, or $SO_4^{2-}$).

In the radicals $R_1$, $R_2$, and $R_3$ it is preferable for each alkoxy and alkyl to contain from 1 to 6 carbon atoms.

Each aromatic ring in the novel monodisperse anion exchangers preferably has from 0.1 to 2 of the above-mentioned functional groups (1) or (2).

The anion exchangers prepared according to the invention are used to remove anions from aqueous or organic solutions, to remove anions from condensates, to remove color particles from aqueous or organic solutions, and to remove organic components from aqueous solutions, for example, humic acids from surface water.

The novel anion exchangers may also be used for purification and treatment of water in the chemical industry or electronics industry, in particular, for preparing ultra-high-purity water.

The novel anion exchangers may also be used in combination with gel-type and/or macroporous cation exchangers for deionizing aqueous solutions and/or condensates.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

Example 1

1 a) Preparation of the Monodisperse Macroporous Bead Polymer Based On Styrene, Divinylbenzene, and Ethylstyrene 3000 g of deionized water were placed in a 10 liter glass reactor, and a solution made from 10 g of gelatin, 16 g of disodium hydrogen phosphate dodecahydrate, and 0.73 g of resorcinol in 320 g of deionized water was added and thoroughly mixed. The temperature of the mixture was controlled to 25° C. Then, with stirring, a mixture made from 3200 g of microencapsulated monomer droplets with a narrow particle size distribution and made from 3.6% by weight of divinylbenzene and 0.9% by weight of ethylstyrene (used in the form of a commercially available isomer mixture of divinylbenzene and ethylstyrene in 80% of divinylbenzene), 0.5% by weight of dibenzoyl peroxide, 56.2% by weight of styrene, and 38.8% by weight of isododecane (industrial isomer mixture with a high proportion of pentamethylheptane), wherein the microcapsules were composed of a formaldehyde-hardened complex coacervate made from gelatin and from a copolymer of acrylamide and acrylic acid, was introduced and 3200 g of aqueous phase with a pH of 12 was added. The average particle size of the monomer droplets was 460 µm.

The mix was polymerized to completion, with stirring, by increasing the temperature according to a temperature program starting at 25° C. and finishing at 95° C. The mix was cooled, washed using a 32 µm screen, and then dried in vacuo at 80° C. This gave 1893 g of a spherical polymer with an average particle size of 440 µm, narrow particle size distribution, and a smooth surface.

The polymer had a chalky-white appearance from above and had a bulk density of about 370 g/l.

1 b) Preparation of the Amidomethylated Bead Polymer 2400 g of dichloroethane, 595 g of phthalimide, and 413 g of 30% strength by weight formalin were placed in a vessel at room temperature. The pH of the suspension was adjusted to from 5.5 to 6 using aqueous sodium hydroxide. The water was then removed by distillation. 43.6 g of sulfuric acid were then metered in and the resultant water was removed by distillation. The mix was cooled. 174.4 g of 65% strength oleum were metered in at 30° C., followed by 300 g of monodisperse bead polymer prepared according to process step 1a). The suspension was heated to 70° C. and stirred for a further 6 hours at this temperature. The reaction liquid was drawn off, deionized water was metered in, and residual dichloroethane was removed by distillation.

Yield of amidomethylated bead polymer: 1820 ml
Composition by elemental analysis:
carbon: 75.3% by weight;
hydrogen: 4.6% by weight;
nitrogen: 5.75% by weight.

1 c) Preparation of the Aminomethylated Bead Polymer 851 g of 50% strength by weight aqueous sodium hydroxide and 1470 ml of deionized water were metered at room temperature into 1770 ml of amidomethylated bead polymer from Example 1b). The suspension was heated to 180° C. and stirred for 8 hours at this temperature. The resultant bead polymer was washed with deionized water.

Yield of aminomethylated bead polymer: 1530 ml
The overall yield (extrapolated) was 1573 ml.
Composition by elemental analysis:
carbon: 78.2% by weight;
nitrogen: 12.25% by weight;
hydrogen: 8.4% by weight.

Amount of aminomethyl groups in mol per liter of aminomethylated bead polymer: 2.13
Amount of aminomethyl groups in mol in the total yield of aminomethylated bead polymer: 3.259

On statistical average each aromatic ring—stemming from the styrene units and divinylbenzene units—had 1.3 hydrogen atoms substituted by aminomethyl groups.

1d) Preparation of a Monodisperse, Weakly Basic Anion Exchanger Having Dimethylaminomethyl Groups 1995 ml of deionized water and 627 g of 29.8% strength by weight formalin solution were metered at room temperature into 1330 ml of aminomethylated bead polymer from Example 1 c). The mix was heated to 40° C. This was followed by heating to 97° C. over a period of 2 hours. During this time, a total of 337 g of 85% strength by weight formic acid were metered into the mix. The pH was then adjusted to pH 1 within a period of 1 hour using 50% strength by weight sulfuric acid. Stirring continued for 10 hours at pH 1. After cooling, the resin was washed with deionized water and, using aqueous sodium hydroxide, freed from sulfate and converted into the OH form.

Yield of resin having dimethylamino groups: 1440 ml
The overall yield (extrapolated) was 1703 ml.
The product contained 2.00 mol of dimethylamino groups per liter of resin.
The total amount of dimethylamino groups in mol in the total yield of product having dimethylamino groups was 3.406.

Example 2

Preparation of a Monodisperse, Moderately Basic Anion Exchanger Having Dimethylaminomethyl Groups and Also Trimethylaminomethyl Groups An initial charge of 1220 ml of bead polymer from Example 1d) containing dimethylaminomethyl groups, 1342 ml of deionized water, and 30.8 g of chloromethane at room temperature was heated to 40° C. and stirred at this temperature for 6 hours.

Yield of resin containing dimethylaminomethyl groups and trimethylaminomethyl groups: 1670 ml.
The extrapolated overall yield was 2331 ml.

Of the groups containing nitrogen atoms within the product, 24.8% were trimethylaminomethyl groups and 75.2% were dimethylaminomethyl groups.

The utilizable capacity of the product is 1.12 mol/liter of resin.

Stability of the resin in its original state: 98 perfect beads per 100.
Stability of the resin after the roller test: 96 perfect beads per 100.
Stability of the resin after the swelling stability test: 98 perfect beads per 100.
94% by volume of the beads in the final product had a size between 0.52 and 0.65 mm.

Example 3

Preparation of a Monodisperse, Strongly Basic Anion Exchanger Having Hydroxyethyldimethylaminomethyl Groups The initial charge was 1230 ml of the resin prepared as in Example 1d) and having dimethylaminomethyl groups and 660 ml of deionized water. 230.5 g of 2-chloroethanol were metered into this mixture within a period of 10 minutes. The mixture was heated to 55° C. A pH of 9 was set by pumping in 20% strength by weight aqueous sodium hydroxide. The mixture was stirred for 3 hours at pH 9, the pH was then adjusted to 10 using aqueous sodium hydroxide, and the mixture was stirred for a further 4 hours at pH 10. After cooling, the product was washed with deionized water in a column and three times the bed volume of 3% strength by weight hydrochloric acid were then passed through the column.

Yield: 1980 ml

The utilizable capacity of the product was: 0.70 mol/liter of resin.

Stability of the resin in its original state: 96 perfect beads per 100.

Stability of the resin after the roller test: 70 perfect beads per 100.

Stability of the resin after the swelling stability test: 94 perfect beads per 100.

94% by volume of the beads in the final product had a size between 0.52 and 0.65 mm.

Example 4

Comparative Example

Preparation of Monodisperse Basic Anion Exchangers Based on a Bead Polymer Prepared by the Process Given in EP-A 46,535 with Reference to U.S. Pat. No. 3,989,650

4a) Bead Polymer Preparation Analogous to Example 1a)

4b) Preparation of the Amidomethylated Bead Polymer 2400 ml of dichloroethane, 595 g of phthalimide, and 413 g of 30.0% by weight formalin were the initial charge at room temperature. The pH of the suspension was set at from 5.5 to 6 using aqueous sodium hydroxide. The water was then removed by distillation.

The mixture was cooled to 60° C. and 454 g of acetic anhydride were then metered in within a period of 30 minutes. The mixture was heated to reflux temperature and stirred at this temperature for a further 5 hours.

The mixture was cooled to 60° C. and 300 g of bead polymer according to Example 1a) were metered in. The resultant mixture was heated to reflux temperature (about 90° C.) and at this temperature 210 g of sulfuric acid were metered in over a period of 4 hours. This was followed by stirring for a further 6 hours at this temperature. The reaction liquid was drawn off, deionized water was metered in, and residual amounts of dichloroethane were removed by distillation.

Yield of amidomethylated bead polymer: 1250 ml
Composition by elemental analysis:
carbon: 78.5% by weight;
hydrogen: 5.3% by weight;
nitrogen: 4.85% by weight.

4c) Preparation of the Aminomethylated Bead Polymer 505 g of 50% strength by weight aqueous sodium hydroxide and 1110 ml of deionized water were metered at room temperature into 1200 ml of amidomethylated bead polymer from Example 4b). The suspension was heated to 180° C. and stirred for 8 hours at this temperature. The resultant bead polymer was washed with deionized water.

Yield of aminomethylated bead polymer: 950 ml.
The extrapolated overall yield was 990 ml.
Composition by elemental analysis:
carbon: 82.5% by weight;
nitrogen: 7.65% by weight;
hydrogen: 8.2% by weight.

Amount of aminomethyl groups in mol per liter of aminomethylated bead polymer: 1.93.

Amount of aminomethyl groups in mol in the overall yield of aminomethylated bead polymer: 1.83.

On statistical average per aromatic ring—stemming from the styrene and divinylbenzene units—0.79 hydrogen atoms were substituted by aminomethyl groups—the degree of substitution of the aromatic rings by aminomethyl groups.

4d) Preparation of a Monodisperse, Weakly Basic Anion Exchanger Having Dimethylaminomethyl Groups 1170 ml of deionized water and 333 g of 29.8% strength by weight formalin solution were metered at room temperature into 780 ml of aminomethylated bead polymer from Example 4c). The mixture was heated to 40° C., and then heated to 97° C. within a period of 2 hours. This was the stage during which 179.2 g of 85% strength by weight formic acid were metered in. The pH was then adjusted to pH 1 within a period of 1 hour using 50% strength by weight sulfuric acid. Stirring continued for 10 hours at pH 1. After cooling, the resin was washed with deionized water, freed from sulfate using aqueous sodium hydroxide, and converted into the OH form.

Yield of resin containing dimethylamino groups: 1050 ml.
Overall yield (extrapolated) gave 1333 ml
The product contained 1.87 mol of dimethylamino groups per liter of resin.

Amount of dimethylamino groups in mol in the overall yield of resin containing dimethylaminomethyl groups: 2.493.

Example 5

Comparative Example

5d) Preparation of a Monodisperse, Moderately Basic Anion Exchanger Based on a Bead Polymer Having Dimethylaminomethyl Groups and Also Trimethylaminomethyl Groups 700 ml of bead polymer from Example 4d) containing dimethylaminomethyl groups, 780 ml of deionized water, and 16.5 g of chloromethane at room temperature were heated to 40° C. and stirred at this temperature for 6 hours.

Yield of resin containing dimethylaminomethyl groups and trimethylaminomethyl groups: 951 ml.

The extrapolated overall yield was 1811 ml.

Of the groups containing nitrogen atoms within the product, 24.3% were trimethylaminomethyl groups and 75.7% were dimethylaminomethyl groups.

The utilizable capacity of the product was 0.82 mol/liter of resin.

Stability of the resin in its original state: 97 perfect beads per 100.

Stability of the resin after the roll test: 94 perfect beads per 100.

Stability of the resin after the swelling stability test: 96 perfect beads per 100.

94% by volume of the beads in the final product had a size between 0.52 and 0.65 mm.

Test Methods:

Number of Perfect Beads after Preparation 100 beads were inspected under a microscope. The number of beads that were cracked or splintered was counted. The number of perfect beads is given by the difference between the number of damaged beads and 100.

Determination of the Stability of the Resin by the Roll Test

The bead polymer to be tested was distributed at a uniform layer thickness between two cloths made of synthetic material. The cloths were laid on a firm horizontal substrate and subjected to 20 operating cycles in a roll apparatus. An operating cycle was composed of one pass and return pass of the roll. After rolling, representative samples of 100 beads were taken and the number of undamaged beads counted under a microscope.

Swelling Stability Test 25 ml of anion exchanger in the chloride form were placed in a column. 4% strength by weight aqueous sodium hydroxide, deionized water, 6% strength by weight hydrochloric acid, and, again, deionized water were fed to the column in succession. The aqueous sodium hydroxide and the hydrochloric acid flowed downward through the resin, while the deionized water was pumped upward through the resin. A control device controlled the treatment in time cycles. One operating cycle lasted 1 hour. 20 operating cycles were carried out. Once the operating cycles had ended, 100 beads were counted out from the resin sample. The number of perfect beads, not damaged by cracking or splintering, was counted.

Utilizable Capacity of Strongly Basic and Moderately Basic Anion Exchangers 1000 ml of anion exchanger in the chloride form (i.e., with chloride as the counterion for the nitrogen atom) were placed in a glass column. 2500 ml of 4% by weight aqueous sodium hydroxide were passed through the column over the resin in 1 hour. This was followed by washing with 2 liters of debasified (i.e., decationized) water. Water with a total anion hardness of 25° German hardness was then passed through the column over the resin at a rate of 10 liters per hour. The eluent was analyzed for hardness and also for residual silicic acid. The loading ended at a residual silicic acid content of $\geq 0.1$ mg/l.

The amount of water which passed through the column over the resin, the total anion hardness of the water passed through the column, and the amount of resin incorporated were used to determine how many grams of CaO are absorbed per liter of resin. The amount of CaO in grams gives the utilizable capacity of the resin in terms of the unit: grams of CaO per liter of anion exchanger.

Volume Difference Chloride/OH Form

Deionized water was used to wash 100 ml of anion exchanger having basic groups into a glass column. 1000 ml of 3% strength by weight hydrochloric acid were passed through the column in 1 hour and 40 minutes. The resin was then washed with deionized water until free of chloride. The resin was washed into a tamp volumeter under deionized water and agitated to constant volume—volume V 1 of the resin in the chloride form.

The resin was transferred back to the column. 1000 ml of 2% strength by weight aqueous sodium hydroxide were passed through the column. The resin was then washed with deionized water to remove alkali until the eluent had a pH of 8. The resin was washed out into a tamp volumeter under deionized water and agitated to constant volume—volume V2 of the resin in the free base form (OH form).

Calculation: $V1-V2=V3$

V3: V1/100=Swelling Difference Chloride/OH Form in %

Determination of the Amount of Basic Aminomethyl Groups in the Aminomethylated, Crosslinked Polystyrene Bead Polymer 100 ml of the aminomethylated bead polymer were agitated in the tamp volumeter and then, using deionized water, washed into a glass column. 1000 ml of 2% strength by weight aqueous sodium hydroxide were passed through the column during a period of 1 hour and 40 minutes. Deionized water was then passed through the column until 100 ml of eluate, mixed with phenolphthalein, consumed not more than 0.05 ml of 0.1 N hydrochloric acid.

50 ml of this resin were mixed in a glass beaker with 50 ml of deionized water and 100 ml of 1 N hydrochloric acid. The suspension was stirred for 30 minutes and then placed in a glass column. The liquid was discharged. A further 100 ml of 1 N hydrochloric acid were passed over the resin during a period of 20 minutes. 200 ml of methanol were then passed through the column. All the eluates were collected and combined and titrated with 1 N aqueous sodium hydroxide using methyl orange indicator.

The amount of aminomethyl groups in 1 liter of aminomethylated resin was calculated from the following formula: $(200-V) \cdot 20$=mol of aminomethyl groups per liter of resin.

Determination of the Degree of Substitution of the Aromatic Rings in the Crosslinked Bead Polymer by Aminomethyl Groups The amount of aminomethyl groups in the total amount of aminomethylated resin was determined by the above method.

The molar amount of aromatic systems present in the amount of bead polymer used—A in grams—was calculated via division by the molecular weight.

For example, 300 grams of bead polymer were used to prepare 950 ml of aminomethylated bead polymer with 1.8 mol/l of aminomethyl groups.

950 ml of aminomethylated bead polymer contained 2.82 mol of aromatic systems.

For each aromatic system, then, there was 1.8/2.81=0.64 mol of aminomethyl groups.

The degree of substitution of the aromatic rings in the crosslinked bead polymer by aminomethyl groups was 0.64.

TABLE 1

Parameters for the preparation of anion exchangers by the novel process, and also in comparative experiments as in EP-A 46,535 and U.S. Pat. No. 3,989,650, respectively

| Example | Yield, process step b) | Degree of substitution of the aromatic rings in the bead polymer by aminomethyl groups | Total amount of aminomethyl groups in process step c) in mol | Yield of product having dimethyl-aminomethyl groups in ml/g of bead polymer | Yield of product having dimethyl- and trimethyl-aminomethyl groups in ml/g of bead polymer | Utilizable capacity in mol/l of resin, Example 2 compared with Example 5 |
|---|---|---|---|---|---|---|
| According to the invention, Examples 1 and 2 | 5.24 | 1.30 | 3.351 | 5.68 | 7.77 | 1.12 |

TABLE 1-continued

Parameters for the preparation of anion exchangers by the novel process, and also in comparative experiments as in EP-A 46,535 and U.S. Pat. No. 3,989,650, respectively

| Example | Yield, process step b) | Degree of substitution of the aromatic rings in the bead polymer by aminomethyl groups | Total amount of aminomethyl groups in process step c) in mol | Yield of product having dimethyl-aminomethyl groups in ml/g of bead polymer | Yield of product having dimethyl- and trimethyl-aminomethyl groups in ml/g of bead polymer | Utilizable capacity in mol/l of resin, Example 2 compared with Example 5 |
|---|---|---|---|---|---|---|
| Comparative example as in EP-A-46,535 and U.S. Pat. No. 3,989,650, Examples 4 and 5 | 3.30 | 0.79 | 1.909 | 4.44 | 5.98 | 0.82 |

Surprisingly, it can be seen that, compared with the processes described in EP-A 46,535 and U.S. Pat. No. 3,989,650, the novel process permits the preparation of anion exchangers of varying basicity at a higher yield, having a larger amount of nitrogen-containing groups per aromatic ring, and having a higher absorption capacity for anions of various types, by a process that does not generate large volumes of wastewater.

What is claimed is:

1. A process for preparing monodisperse anion exchangers comprising
    (a) reacting monomer droplets made from at least one monovinylaromatic compound including styrene and at least one polyvinylaromatic compound to give a monodisperse, crosslinked bead polymer,
        wherein the polyvinylaromatic compound is an amount from about 1% to 20% by weight based on the mixture with the monomer or mixture with other monomers,
        wherein the monomer droplets include initiators or mixtures of initiators in an amount of about 0.05% to 2.5% by weight based on the mixture with the monomer or mixture with other monomers,
    (b) amidomethylating the monodisperse, crosslinked bead polymer from step (a) with phthalimide or methylphthalimide,
    (c) convening the amidomethylated bead polymer from step (b) to an aminomethylated bead polymer, and
    (d) alkylating the aminomethylated bead polymer from step (c).

2. A process according to claim 1 wherein the monomer droplets are microencapsulated using a complex coacervate.

3. A process according to claim 1 wherein step (a) is carried out in the presence of a protective colloid.

4. A process according to claim 1 wherein step (a) is carried out in the presence of at least one initiator.

5. A process according to claim 1 wherein the monomer droplets comprise porogens that, after the polymerization, form macroporous, crosslinked bead polymers.

6. A process according to claim 1 wherein a polymerization inhibitor is used in step (a).

7. A process according to claim 3 wherein the protective colloids are gelatin, starch, polyvinyl alcohol, polyvinylpyrrolidone, polyacrylic acid, polymethacrylic acid, copolymers made from (meth)acrylic acid or (meth)acrylate, or mixtures thereof.

8. A process according to claim 1 wherein the monovinylaromatic compounds are monoethylenically unsaturated compounds.

9. A process according to claim 1 wherein the polyvinylaromatic compounds are divinylbenzene, divinyltoluene, trivinylbenzene, divinylnaphthalene, trivinylnaphthalene, 1,7-octadiene, 1,5-hexadiene, ethylene glycol dimethacrylate, trimethylolpropane trimethacrylate, allyl methacrylate, or mixtures thereof.

10. A process according to claim 1 wherein the initiator is a peroxy compound or an azo compound.

11. A process according to claim 10 wherein the initiator is dibenzoyl peroxide, dilauroyl peroxide, bis-(p-chlorobenzoyl) peroxide, dicyclohexyl peroxydicarbonate, tert-butyl peroctoate, tert-butyl peroxy-2-ethyl-hexanoate, 2,5-bis-(2-ethylhexanoylperoxy)-2,5-dimethylhexane, or tert-amylperoxy-2-ethylhexane.

12. A process according to claim 10 wherein the initiator is 2,2'-azobis(isobutyronitrile) or 2,2'-azobis-(2-methylisobutyronitrile).

13. A process according to claim 1 wherein a phthalimido ether is formed in stop (b).

14. A process according to claim 13 wherein the phthalimido ether is prepared from phthalimide or methylphthalimide and formalin.

15. A process according to claim 13 wherein the reaction of the phthalimido ether with the bead polymer takes place in the presence of oleum, sulfuric acid, or sulfur trioxide.

16. A process according to claim 1 further wherein the monomer droplets include porogens.

* * * * *